US008641522B2

(12) United States Patent
Tarantino

(10) Patent No.: US 8,641,522 B2
(45) Date of Patent: *Feb. 4, 2014

(54) METHOD AND SYSTEM FOR ONLINE POKER PLAY

(76) Inventor: Elia Rocco Tarantino, Las Vegas, NV (US)

( * ) Notice: Subject to any disclaimer, the term of this patent is extended or adjusted under 35 U.S.C. 154(b) by 184 days.

This patent is subject to a terminal disclaimer.

(21) Appl. No.: 13/237,089

(22) Filed: Sep. 20, 2011

(65) Prior Publication Data

US 2012/0238356 A1 Sep. 20, 2012

Related U.S. Application Data

(63) Continuation-in-part of application No. 13/047,262, filed on Mar. 14, 2011, now Pat. No. 8,529,342.

(51) Int. Cl.
*G06F 17/00* (2006.01)

(52) U.S. Cl.
USPC .......... 463/29

(58) Field of Classification Search
USPC .......... 463/16–25, 29, 42
See application file for complete search history.

(56) References Cited

U.S. PATENT DOCUMENTS 4,365,810 A 12/1982 Richardson
4,848,771 A 7/1989 Richardson
5,007,649 A 4/1991 Richardson
5,851,149 A 12/1998 Xidos et al.
6,368,218 B2 4/2002 Angell, Jr.
6,409,602 B1 6/2002 Wiltshire et al.
6,652,378 B2 11/2003 Cannon et al.
6,682,421 B1 1/2004 Rowe et al.
6,846,238 B2 1/2005 Wells
7,413,513 B2 8/2008 Nguyen et al.
7,512,235 B2 3/2009 Multerer et al.
7,588,495 B2 9/2009 Walker et al.
7,604,541 B2 10/2009 Aikin et al.
7,699,702 B2 4/2010 Daniel
7,699,703 B2 * 4/2010 Muir et al. .......... 463/29
7,727,060 B2 6/2010 Mills
7,877,798 B2 * 1/2011 Saunders et al. .......... 726/20
2003/0032481 A1 2/2003 Pfeiffer et al.

(Continued)

FOREIGN PATENT DOCUMENTS

WO WO2012/125604 9/2012
WO WO2012/125630 9/2012

OTHER PUBLICATIONS

PCT "Notification of Transmittal of the International Search Report and the Written Opinion of the International Searching Authority, or the Declaration for PCT/US2012/028866," mailed Nov. 1, 2012.

(Continued)

*Primary Examiner* — Ronald Laneau
(74) *Attorney, Agent, or Firm* — Weide & Miller, Ltd.

(57) ABSTRACT

In a gaming system players are assigned individual gaming devices comprising electronic game boards. Players access their assigned gaming device via a gateway from a remote presentation device such as a player's computer. The gateway confirms the identity of each player so that a player may only access their assigned and dedicated gaming device. A player may link to a game server via their dedicated gaming device, such as to play an on-line poker game. Additional aspects of the invention comprise methods of preventing player collusion in on-line wagering games.

10 Claims, 7 Drawing Sheets

(56) References Cited

U.S. PATENT DOCUMENTS

| | | | |
|---|---|---|---|
| 2005/0037838 | A1 | 2/2005 | Dunaevsky et al. |
| 2006/0189382 | A1* | 8/2006 | Muir et al. ...................... 463/29 |
| 2006/0287067 | A1 | 12/2006 | White et al. |
| 2007/0155460 | A1 | 7/2007 | Burnside et al. |
| 2008/0004107 | A1 | 1/2008 | Nguyen et al. |
| 2008/0113807 | A1 | 5/2008 | Alderucci |
| 2008/0254897 | A1 | 10/2008 | Saunders et al. |
| 2009/0088240 | A1 | 4/2009 | Saunders et al. |
| 2009/0088257 | A1 | 4/2009 | Saunders et al. |
| 2009/0093311 | A1 | 4/2009 | Saunders et al. |
| 2009/0093312 | A1 | 4/2009 | Carlson |
| 2010/0035694 | A1 | 2/2010 | Losica |
| 2010/0075743 | A1 | 3/2010 | Yoshizawa |
| 2010/0216534 | A1 | 8/2010 | Peck et al. |

OTHER PUBLICATIONS

PCT "Notification of Transmittal of the International Search Report and the Written Opinion of the International Searching Authority, or the Declaration for PCT/US2012/028870." mailed Oct. 29, 2012.

PCT "Notification of Transmittal of the International Search Report and the Written Opinion of the International Searching Authority, or the Declaration for PCT/US2012/028917," mailed Nov. 1, 2012.

* cited by examiner

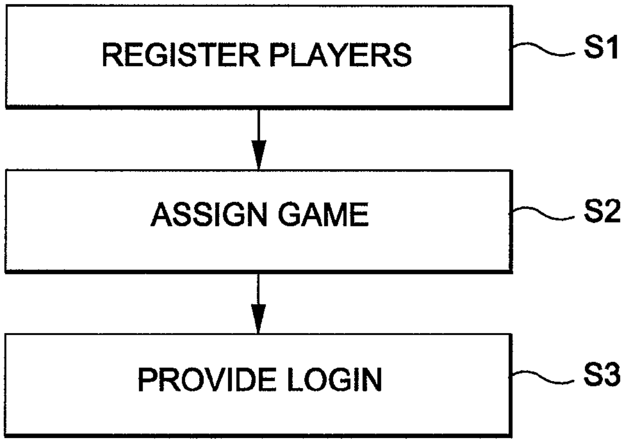
FIG. 6A
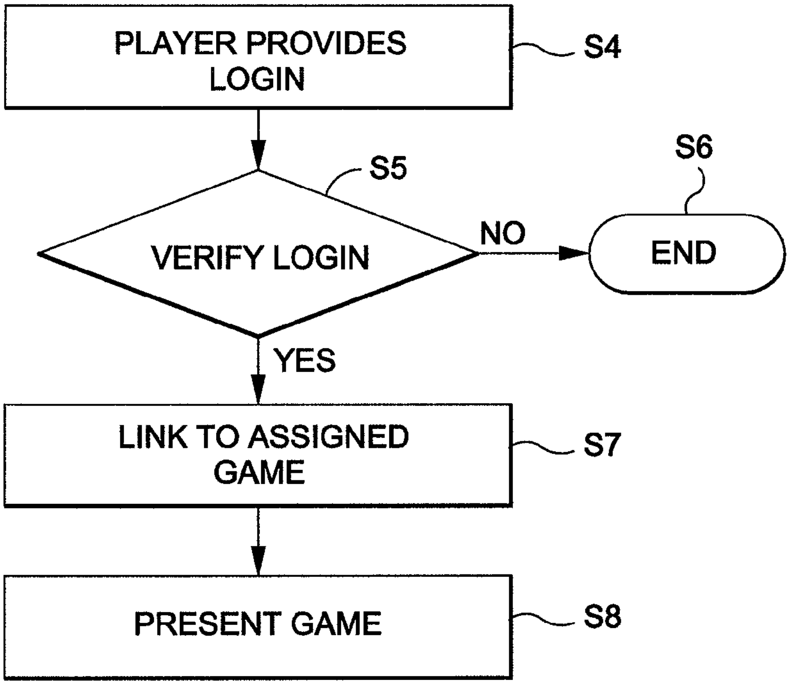
FIG. 6B
| PLAYER NAME | ID | PASSWORD | GAMING DEVICE |
| --- | --- | --- | --- |
| ROCCO TARANTIINO | RT4216 | LASVEGAS | 2XF7114GK21 |
| ⋮ | ⋮ | ⋮ | ⋮ |
FIG. 6C

METHOD AND SYSTEM FOR ONLINE POKER PLAY

RELATED APPLICATION DATA

This application is a continuation-in-part of U.S. application Ser. No. 13/047,262, filed Mar. 14, 2011 now U.S. Pat. No. 8,529,342.

FIELD OF THE INVENTION

The present invention relates to online wagering games and gaming systems.

BACKGROUND OF THE INVENTION

Wager based gaming continues to grow in popularity. In order to meet player demand, gaming machine manufacturers continue to develop new games and gaming machines.

Originally, wager based games comprised physical card, dice and similar games played at tables, and mechanical slot machines having physical spinning reels bearing printed symbols. In recent years, gaming machines have been developed which incorporate the latest technologies such as electronic video displays and sound systems for presenting extreme graphics and sounds. These machines may present slot-type games via graphical representations of spinning reels on a video display. Likewise, gaming tables may employ video screens, electronic chip trackers and other technologies.

Despite the use of such new technologies, the premise of wager based gaming remains the same. A player places a wager and attempts to achieve a winning outcome of a game. If the outcome of the game is a winning outcome, the player is paid winnings. In some cases, such as in slot-type games, the outcome of the game is entirely random. In other games, such as poker games, the outcome may depend upon player input such as the selection of cards which are held or discarded when forming a poker hand.

While the outcomes of these games cannot be controlled by the player, players are generally superstitious and believe that "luck" has much to do with whether they win or lose. As such, as described in the Background of U.S. Pat. No. 7,699,703, players often believe that outside factors have an impact upon the probability of their winning games.

For example, a player may play a gaming machine and receive several winning outcomes. That player may believe that the gaming machine is "hot" and thus not want to leave that gaming machine. In particular, players often believe that if they leave a "hot" machine and another player plays the machine, the streak of wins may end, so that when the player returns, the gaming machine has been affected by the intervening player's play.

Many newer games offer a variety of features which may extend or relate to more than one game event. For example, progressive jackpots are common for wagering game play. A progressive jackpot is an award which grows over time, such as based upon game wagers or the number of games played. The progressive jackpot may be awarded to the player who receives a certain qualifying winning outcome.

As one example, a single gaming machine might have an associated progressive jackpot. The progressive jackpot might start at $1000.00. A player might play 50 wagering games at the machine without receiving the progressive jackpot winning outcome. During that time, the progressive jackpot might grow to $1500.00. Having played so many games without having yet triggered the progressive jackpot winning outcome, the player may believe that such an outcome is imminent. As a result, the player may not wish to leave the gaming machine for fear that another player will play the machine and be the one who receives the progressive jackpot winning outcome.

Other games may include similar features such as bonuses. As one example, a player might play games in which the player collects certain bonus symbols, such as described in U.S. Pat. No. 6,135,884 wherein a player may collect "cherry" symbols as they appear on slot reels. When the player has played a sufficient number of games to aggregate a predetermined number of bonus symbols, the player play be awarded a bonus award. As a result, the player may be reticent to leave a gaming machine after the player has a collected a large number of the symbols required for the bonus, knowing that another player might play the gaming machine and collect the few remaining required symbols and thus win the bonus.

Various attempts have been made to solve these issues. For example, U.S. Patent Application Publication No. 2007/0010309 describes a configuration in which a player might save a game state. As described, a player might identify themselves at a gaming machine, such as via a player club card. A player who is in the middle of a game might stop play and the status of the game may be stored. That player may then later return to the gaming machine and after identifying themselves, the status of the game may be restored based upon game state information stored with the player's identity so that the player may finish the game.

Such a feature has a number of drawbacks. First, such a feature does not prevent other players from playing a gaming machine between game plays by the player. Thus, for example, if the gaming machine had an associated progressive jackpot which grows for each game play at the gaming machine, an intervening player might still win the jackpot. In addition, this feature does not prevent other players from playing the gaming machine and ruining the player's luck. For example, a player might stop play after a number of winning outcomes because it has become late in the evening. The player may save the state of the last game. However, once the player leaves another player may play games at that same gaming machine during the night. When the player returns in the morning they may finish the game which was saved, but the player may perceive that all new games presented thereafter have been affected by the intervening player's play and may have resulted in a cessation of the winning streak.

Other feature which is described in U.S. Pat. No. 7,588,495 permits a player to "lock" a gaming machine. This may permit automated play of a number of games or may permit the player to continue to play games from a remote location. However, this solution also has a number of significant drawbacks.

Gaming machines which are located in casinos are typically very sophisticated and expensive devices. The machines include a number of security features, including features to store the state of games played at the gaming machine (such as in the event of a gaming machine failure) and include controllers and a plurality of peripheral devices such as coin acceptors, coin hoppers, bill validators, electronic displays and other components for receiving input from a player and presenting a game to a player. Such gaming machines may cost $10,000 or more per unit. The primary goal of a casino is to offer a sufficient number of gaming machines to meet the demands of all players who have traveled to the casino. Thus, a casino might have as many as 3000-4000 gaming machines. Given the cost of the gaming machines, however, this represents $30,000,000.00-$40,000,000.00 in gaming machines.

In the configuration described in these patents, a player may lock one of these gaming machines for automated or remote play. A significant problem with this configuration is that it takes one of the gaming machines on the floor of the casino out of use or service to players in the casino. Thus, patrons in the casino may wander from machine to machine looking for an available gaming machine, i.e. a machine which is not locked out by some remote player. This could quickly cause the players at the casino to become frustrated and disappointed as they search for available gaming machines, and thus cause them to leave the casino and travel to another casino where there are more gaming machines immediately available for play.

Also, the configuration described in these references does not solve the problem that the gaming machines can be played by multiple players. For example, a player might lock up a gaming machine so that they can play a number of automated games. However, at the end of the game play session, the gaming machine is still located on the gaming floor and is available for play by other players. Thus, though the player may favor a particular gaming machine at the casino because they believe it to be lucky, multiple different players may still play the gaming machine at different times and thus the player may perceive that the gaming machine has been affected by other players' play.

As one way of permitting players to play games at other than a dedicated gaming machine, some entities offer on-line gaming. While on-line wager-based gaming is currently not legal in the U.S., it is legal in other jurisdictions. In these jurisdictions, players typically access a game server from their computer. The game server may permit players to play multi-player games such as poker games.

One problem with online multi-player wagering games is player collusion. Players may attempt to work together when playing poker or similar games at a casino table. However, the dealer and other casino personnel employ various mechanisms to detect player collusion. Because the players are directed in front of the dealer, these methods are very effective.

However, in the online environment, player collusion is much more difficult to detect. For example, two players who are playing an online poker game may actually be talking directly to one another via a telephone line. This allows the players to collaborate relative to an on-line game, whereas such communications would easily be detected if the players were sitting at a casino game table.

Various attempts have been proposed for addressing collusion in online wagering game play. For example, U.S. Pat. Nos. 7,604,541 and 7,699,702 are directed to systems and methods in which each player's game play actions are monitored and then analyzed in an attempt to detect collusion. Such systems require complex algorithms to implement and attempt to detect, rather than prevent, collusion.

SUMMARY OF THE INVENTION

Embodiments of the invention comprise a gaming device, a gaming system having player-dedicated gaming devices, and a method of presenting wagering games.

In one embodiment, a gaming system comprises one or more presentation devices, at least one gateway, and at least one gaming device. Each presentation device may be a dedicated/special purpose device or may be a general purpose device. Preferably, the presentation devices include at least one video display capable of displaying game information, at least one player input device, and at least one communication interface. A presentation device might comprise, for example, a desktop computer, a laptop computer, a cellular phone or a PDA.

The at least one gateway preferably comprises one or more devices which are configured to receive a request for game play by a player of a presentation device and selectively link that player to a gaming device. In a preferred embodiment, the gateway comprises one or more servers. In such an embodiment, the gateway might comprise a server which is configured as a computing device which has a processor for executing instructions, a memory for storing data such as instructions, and at least one communication interface for forming a communication link to both at least one presentation device and a gaming device.

The gaming device is preferably configured to generate game information, transmit game information, receive player input, and generate game outcomes. At one or more times the gaming device is in communication with the gateway, whereby the gaming device may receive information from the gateway and may transmit information to the gateway. In a preferred embodiment, the gaming device comprises a circuit board. Preferably, the gaming device does not have the attributes of a gaming machine. Namely, the gaming device is not directly playable, preferably lacking a display, player input device(s), coin or bill acceptors and other features of standard gaming machines which permit their direct play by a player.

In accordance with the invention, each gaming device is assigned to a unique player, whereby no other player may play the gaming device. The gateway or a device linked thereto may store player identification information such as a User ID and password. A player transmits identification information from their presentation device to the gateway for verification. If verified, a communication link is established through the gateway from the player's presentation device to the gaming device. In this manner, only the assigned player may access their assigned gaming device, even when the assigned player is not using their gaming device.

In one embodiment, a plurality of gaming devices may be linked to one or more gateways. For example, a casino may provide multiple gaming devices in one or more racks in a secure computing area.

The gaming devices and/or gateway may be linked to other devices or systems. For example, in a casino environment the casino may have multiple existing gaming machines on the casino floor. Those gaming machines may be linked to one or more existing player tracking, accounting, bonusing or other systems. The gaming devices and/or gateway may be linked to such devices or systems. For example, the gateway may be linked to an existing casino player tracking system. In this manner, a player's play of a traditional gaming machine on the floor of the casino may be tracked and aggregated with play by the player of their assigned gaming device.

In accordance with the invention, a player may play their assigned gaming device from a remote location. Such a location may be external to a casino (such as the player's home or office). As one aspect of the invention, a player's location may be verified, such as to establish that the player is in a jurisdiction which permits the player to engage in game play.

In a preferred embodiment, one or more of the games presented to a player by their assigned gaming device is a wagering game. The gateway or a linked accounting system may facilitate value transactions, such as wagering of credits, use of a value account or credit card or the like.

In one embodiment, a player may be assigned a gaming device by meeting certain criteria, such as minimum levels of play of traditional gaming machines at a casino. In other embodiments, a player might purchase a gaming device. When a player no longer wishes to play their gaming device, the operator may destroy it.

Various embodiments of the invention comprise methods for assigning a player a unique gaming device and permitting a player to access their gaming device and participate in one or more wagering games from their remote presentation device.

The invention has numerous advantages and benefits. One advantage is that each gaming device can be played by only its assigned player, even when the assigned player is not actively playing the gaming device. In this manner, a player's "good luck" or hot streak cannot be interfered with by an intervening player's play. In addition, because only the assigned player may play games via the gaming device, all of the assigned player's activities can be stored and are never affected by another player's play. For example, a player might stop play in the middle of a game and restart play at that exact same point at a later time. A player might also collect bonus symbols or the like, which symbols only inure to that player because no other player has access to the gaming device. Another advantage of the invention is that players are permitted to engage in game play to an assigned gaming device without taking an existing gaming machine on the casino floor out of service.

Other aspects of the invention comprise methods and systems for presenting on-line wagering games, including multi-player games such as Texas Hold 'em. In one embodiment multiple players access their assigned gaming devices via their presentation devices. Each player who elects to play a particular on-line game is linked to a game server, such as a poker server. The players are placed into game queues. Players in each queue are assigned, preferably randomly, to game instances. Each game instance might comprise, for example, a virtual game table.

The game serve generates game information which is routed to each player of the game instance. The game information is routed to the player via their gaming device. Each player may provide game input, such as placing wagers or bets, via their gaming device.

The game information which is presented to each player may vary depending upon the game being presented. In a game instance of Texas Hold 'em, a graphical interface which includes a representation of a game table may be displayed to each player assigned to that game instance.

Various embodiments of the invention comprise methods for reducing player collusion in on-line wagering games. In one embodiment, a graphical representation of players involved in an on-line multi-player game is displayed to each player. Each player of the game is preferably identified anonymously, such as by a randomly assigned number, letter or other code.

In another embodiment, the positions of the players in each game (such as at each table) are changed at one or more times, such as after each game. In one embodiment, this may comprise randomly re-assigning the players to different of the designators which are used to designate the players in the graphical user interface. The positions of players may be changed so as to accommodate particular game rules, such as the rotation of the button, big blind and small blind in the game of Texas Hold 'em.

In one embodiment, to further prevent players from identifying one another in a wagering game where it is important to know the chip count or value of each player, each player's chip count may be displayed as falling within a range. The chip count or value ranges are preferably chosen so that the players have sufficient information about the financial position of one another to make betting decisions, but at the same time preventing each player from tracking the other players by exact chips counts and thus preventing players from identifying one another for collusion purposes.

Further objects, features, and advantages of the present invention over the prior art will become apparent from the detailed description of the drawings which follows, when considered with the attached figures.

DESCRIPTION OF THE DRAWINGS

FIG. 6A is a flow diagram illustrating a player gaming device registration process;

FIG. 6B is a flow diagram illustrating a login and game play process;

FIG. 6C illustrates a player identification and gaming device assignment record in accordance with one aspect of the invention;

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods and systems for presenting on-line wagering games, including on-line poker games.

Figure 1:
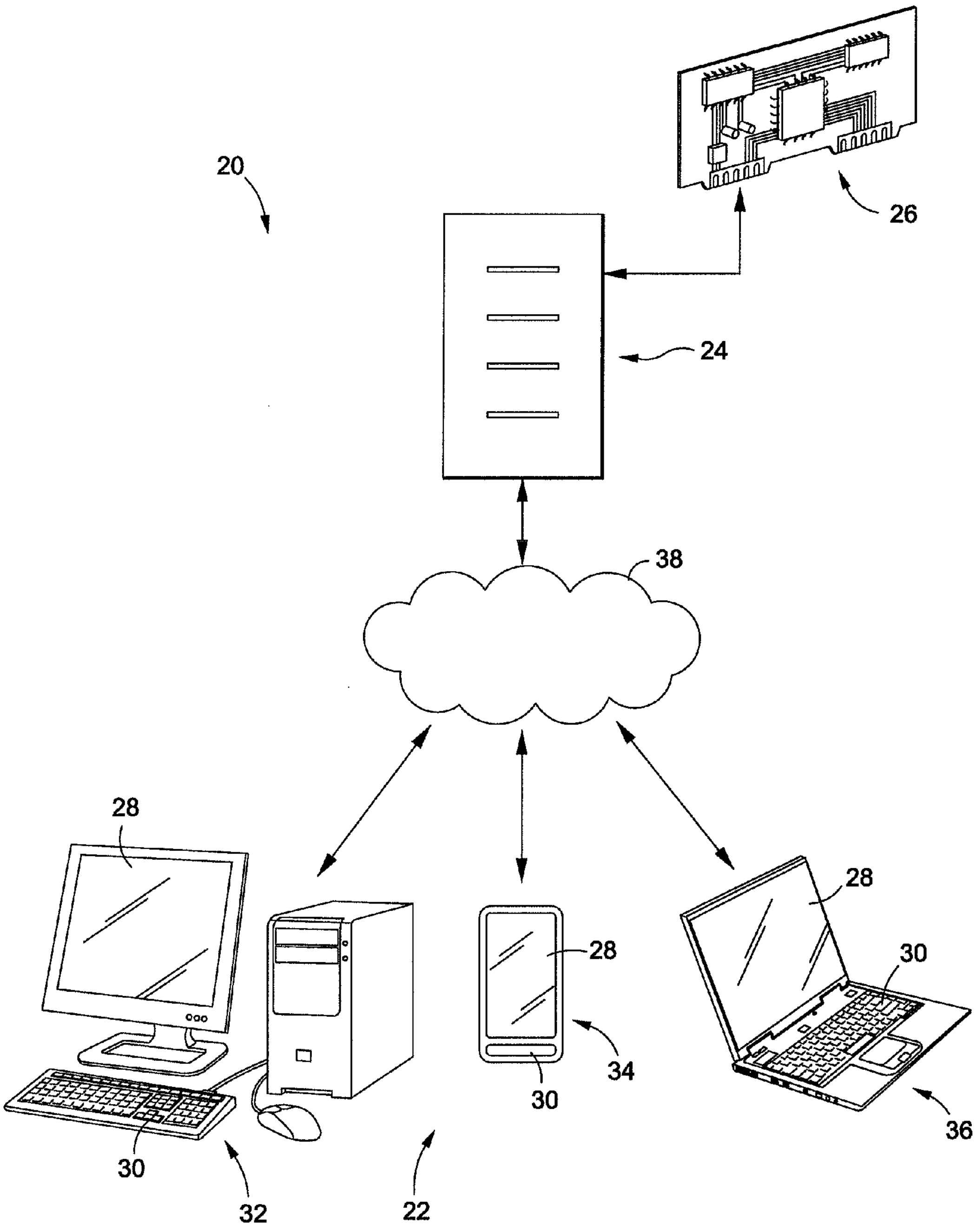
FIG. 1 illustrates a first embodiment system in accordance with the invention, the system including one or more presentation devices, at least one gateway and at least one gaming device.

As illustrated in FIG. 1, in one embodiment, a gaming system 20 comprises one or more presentation devices 22, at least one gateway 24, and at least one gaming device 26. The presentation devices 22 may be dedicated/special purpose devices or may be general purpose devices. Preferably, the presentation devices 22 include at least one video display 28 capable of displaying game information, at least one player input device 30, and at least one communication interface.

The presentation device 22 might comprise, for example, a desktop computer 32, a telephone (including cellular, wireless or wired telephones) or PDA 34 (such as an iPhone®), a laptop or notebook computer 36, or various other devices. As indicated, the presentation device 22 might also comprise a special purpose device such as a specially configured gaming tablet.

The player input device 30 might comprise, for example, a keyboard, mouse, joystick, touch-screen, button(s), trackballs or other devices now known or later configured and which are capable of receiving input from a player. The communication interface is preferably configured to permit information or data to be exchanged from one or more remote device or locations with the presentation device 22. The one or more communication interface might support wired or wireless communications using various protocols. For example, if the presentation device 22 is a PDA, the communications might be by 3G, 4G, IMT, GSM or the like. If the presentation device 22 is a desktop computer, the communications might be by TCP/IP or the like. Of course, other protocols may be used such as Bluetooth, 802.11xx and the like.

It will be appreciated that the presentation device 22 may include other components. For example, the presentation device 22 may include a main processor, a video and/or audio processor, input and output ports or the like.

The at least one gateway 24 is preferably one or more devices which are configured to receive a request for game play by a player of a presentation device 22 and selectively link that player to a gaming device 26. In a preferred embodiment, the gateway 24 comprises one or more servers. In such an embodiment, the gateway 24 might comprise a server which is configured as a computing device which has a processor for executing instructions, a memory for storing data such as instructions, and at least one communication interface for forming a communication link to both at least one presentation device 22 and a gaming device 26. In one embodiment, the gateway 24 might comprise or be in communication with one or more mass data storage devices, such as one or more hard drives or the like.

The gateway 24 might also include one or more user interface features. Such might comprise, for example, a user station which includes a video display and one or input devices (such as a keyboard, mouse or the like). Such a user station may permit an operator to interface with and manage or control the gateway 24, such as to change operator settings and the like.

It will be appreciated that the gateway 24 might comprise more than one device. For example, the gateway 24 might comprise a router and one or more separate computing devices. The functions of the various computing devices might be segregated. For example, one computing device might save and verify login information (as detailed below), while another might monitor game play via the gaming devices.

As described in more detail below, at one or more times a presentation device 22 and the gateway 24 are linked by a communication link between their communication interfaces. The type of communication link may vary, such as depending upon the particular type of presentation device 22 and/or the communication path or protocol which is utilized.

In one embodiment, the presentation device 22 and gateway 24 may communicate through at least one external network 38. Such a network might comprise the Internet, a cellular network, a satellite communication network or the like. Of course, the communication link might comprise a dedicated link, such as a dedicated wired link between the devices. Further, the communication link might comprise a number of local, wide area or other networks or pathways linked together. Such networks might be public and/or private.

The gaming device 26 is preferably configured to generate game information, transmit game information, receive player input, and generate game outcomes. As indicated above, the gaming device 26 is in communication with the gateway 24, whereby the gaming device 26 may receive information from the gateway 24 and may transmit information to the gateway 24.

Figure 2:
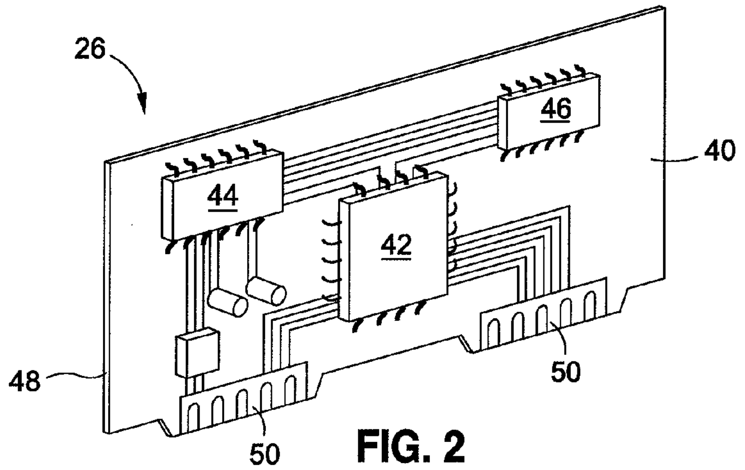
FIG. 2 illustrates a configuration of the invention in which a plurality of gaming devices are associated with at least one gateway.

A preferred embodiment of a gaming device 26 of the invention is illustrated in FIG. 2. In the preferred embodiment, the gaming device 26 comprises a circuit board. In such an embodiment, the gaming device 26 may have a base or substrate 40. Various components are supported by the substrate 40, such as by being attached thereto or imbedded therein.

As indicated, in a preferred embodiment the gaming device 26 is configured to generate game information. In one embodiment, the gaming device 26 comprises means for generating game data or information. Such means may comprise at least one processor 42. The processor 42 is configured generate game information, such as based upon the execution of machine readable game code (i.e. software). Of course, the processor 42 could also be pre-programmed or configured as hardware configured to generate such game data.

In one embodiment, the gaming device 26 includes means for storing game code or instructions. Such means may comprise one or more memory devices 44. Such might comprise RAM, ROM (including EPROM, EEPROM, PROM) or other devices now known or later developed. The gaming device 26 might include one or more other memory device 46, such as for storing game state information or the like, as detailed below.

Preferably, the gaming device 26 includes at least one random number generator (whether configured as software or hardware) or other similar device. Such a generator is preferably utilized as part of the game code to generate random game outcomes. Such components/features are well known to those of skill in the gaming art.

The gaming device 26 preferably also comprises at least one communication device or interface to permit data to be provided to the gaming device 26 and to permit data to be transmitted from the gaming device 26 to one or more remote device 26. Such might comprise a communication interface 48. Once again, the configuration of the communication interface 48 might depend upon the particular type of communications to be utilized (wired or wireless) and the protocols.

In one embodiment, the gaming device 26 comprises at least one connector 50 or interface which both provides power to the gaming device and also serves as a communication pathway. Such connectors 50 may comprise pins, sockets or other elements for establishing a signal pathway to another device (such as one or more ports of a rack, as described below).

Notably, the gaming device 26 of the invention comprises a physical device. At the same time, the gaming device 26 does not include components which are found in standard gaming machines including: a coin, bill, ticket or other "value" acceptor; a coin, bill, ticket or other "value" dispenser; a coin, bill, ticket or other "value" storage device (such as a coin hopper or cash box); a display device (such as a video display or spinning reels); or player input devices (such as buttons, a handle or the like).

Figure 3:
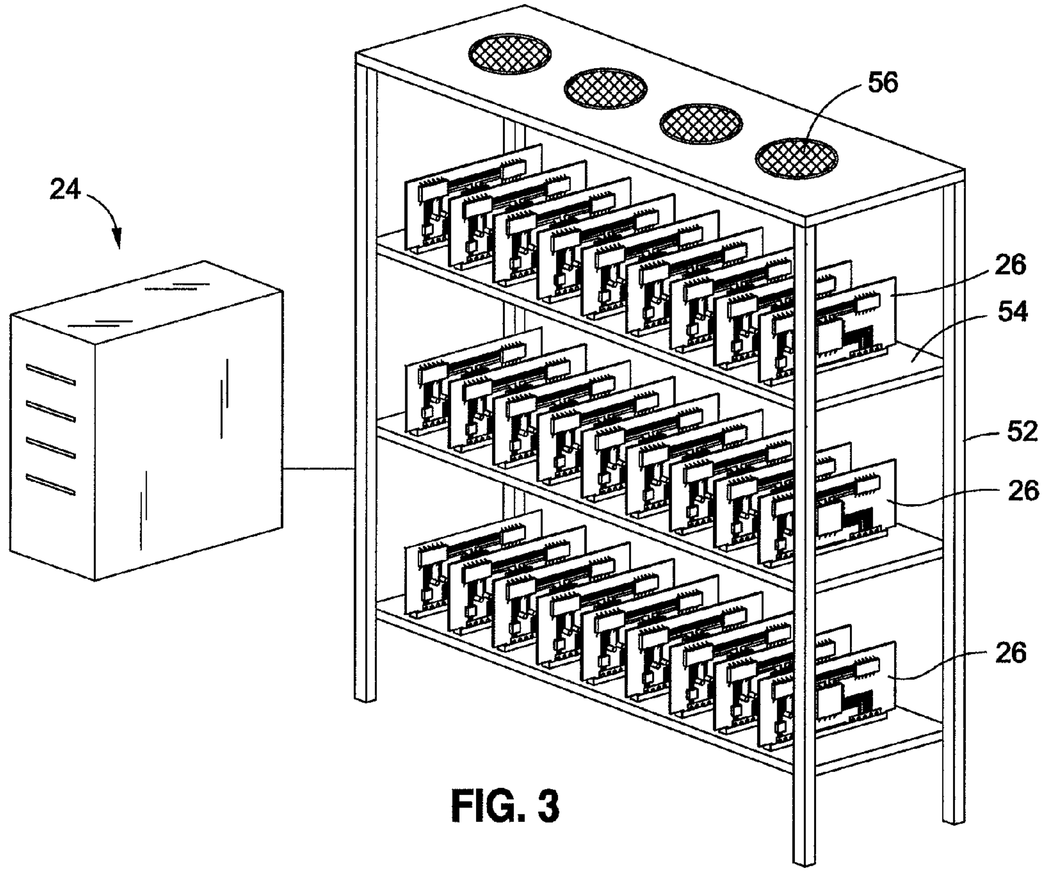
FIG. 3 illustrates an embodiment of a gaming device of the invention.

In a preferred embodiment, as illustrated in FIG. 3, the gaming system 20 comprises a plurality of gaming devices 26. Each gaming device 26 is configured to communicate with at least one gateway 24. In one embodiment, for example, a plurality of gaming devices 26, such as 100 gaming devices, might be associated with a single gateway 24.

In one embodiment, the gaming devices 26 may be mounted in one or more racks 52. Each rack 52 preferably comprises a support structure. The rack 52 might comprise, for example, a steel frame having one or more horizontal and vertical supports.

Each rack 52 may support one or more interfaces 54. The interfaces 54 may define a plurality of slots or ports for accepting therein the connectors 50 of each gaming device 26. The interfaces 54 may thus define a plurality of intermediate communication pathways between the gateway 24 and each slot (to thereby link a gaming device 26 located in the slot with the gateway 24) and intermediate power pathways between one or more power supplies and each slot (to thereby power a gaming device 26 located in a slot).

The rack 52 may include various other features. For example, the rack 52 may further comprise one or more cooling devices 56 such as fans or the like. The rack 52 might further comprise a plurality of power supplies, power cleaning devices (surge protectors, wave reformers and the like) and other devices and features configured to protect the gaming devices 26 and facilitate operation of the gaming devices 26.

In other embodiments, the gaming devices 26 might be located in one or more enclosures. For example, the gaming devices 26 could be mounted in a generally enclosed housing or cabinet. Such might be utilized to protect the gaming devices 26 from the environment, such as dust and other contamination, and to also locate the gaming devices 26 in a controlled atmosphere, such as a temperature controlled environment.

The rack 52 or other gaming device 26 mount might include other features. For example, the gaming devices 26 interfaces might include status indicators, such as lights to indicate whether the gaming device 26 is in a fault mode or otherwise inoperable, to indicate a normal operating condition, to indicate a relative rate of current data exchange or to indicate other conditions.

Additional details of the invention will now be described with reference to FIG. 4. In accordance with the invention, each gaming device 26 is dedicated to a specific player and can only be accessed by that designated player.

In one embodiment, each gaming device 26 is uniquely identifiable, such as by a unique serial or other identification number, port or other location. As described in greater detail below, each gaming device 26 is assigned to a particular player or entity, whereby only that player or entity can interface with the gaming device 26 and play games presented by that gaming device 26.

Figure 4:
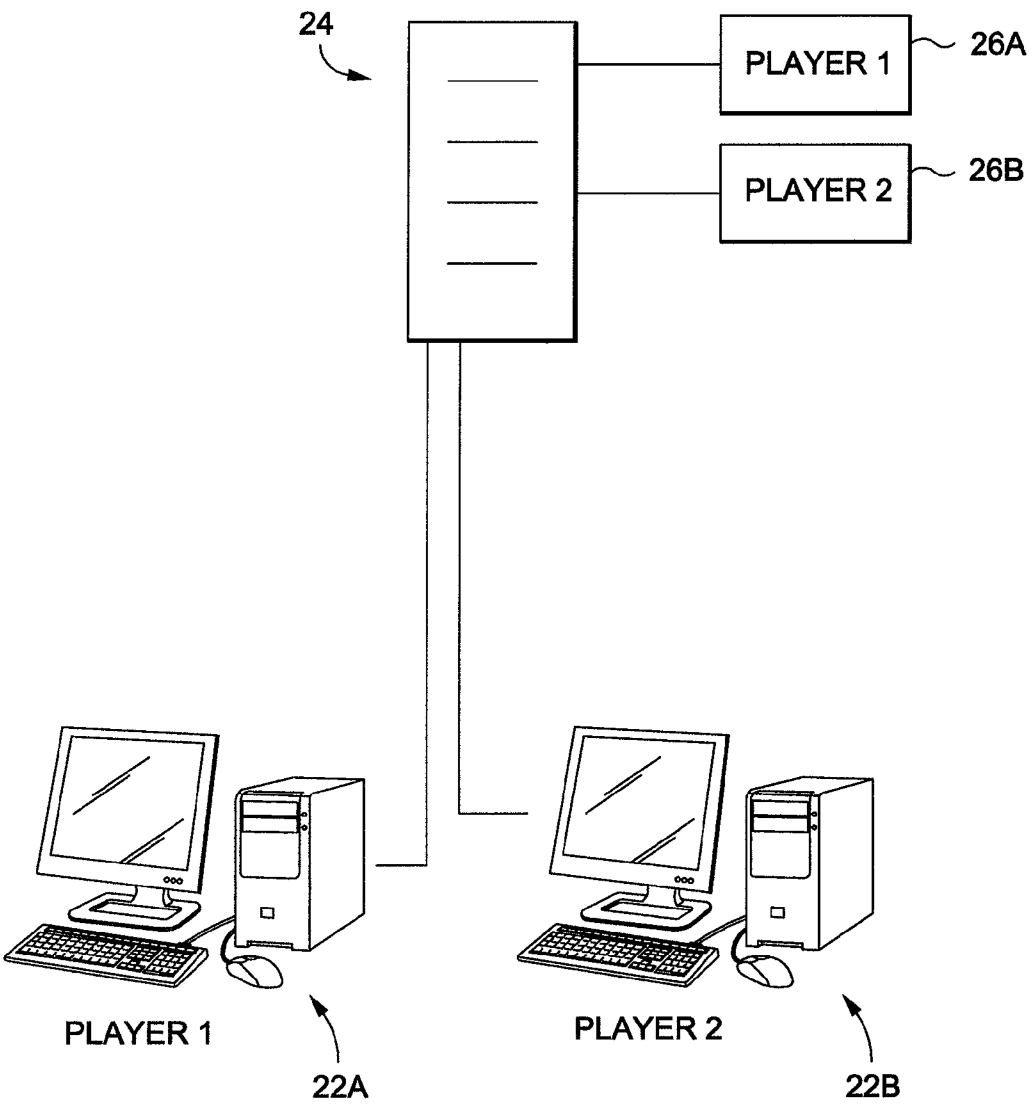
FIG. 4 illustrates the linking of different players via their presentation devices to player assigned gaming devices using a system of the invention.

Thus, as illustrated in FIG. 4, a first player 1 may have a first gaming device 26A assigned or registered to them. A second player 2 may have a second gaming device 26B assigned or registered to them.

The first player 1 might access their assigned gaming device 26A via first presentation device 22A, such as their home desktop computer. As described in greater detail below, the first player may contact the gateway 24 and, subject to identity verification, be placed in communication with their assigned gaming device 26A.

Likewise, second player 2 might access their assigned gaming device 26B via a second presentation device 22B, such as their laptop computer. The second player may contact the gateway 24 and, again subject to identity verification, be placed in communication with their assigned gaming device 26B.

As indicated above and as illustrated in FIG. 2, numerous gaming devices 26 may be provided, wherein each gaming device 26 is assigned or registered to a particular player or entity. Further, the one or more gateways 24 may permit a number of players to access their assigned gaming devices 26. For example, a casino might have 1000 gaming devices 26, such as located in racks in a secure gaming room. The casino might provide as few as one or multiple gateways 24, thus permitting up to 1000 players each access their assigned gaming device 26 at the same or different times.

Figure 5:
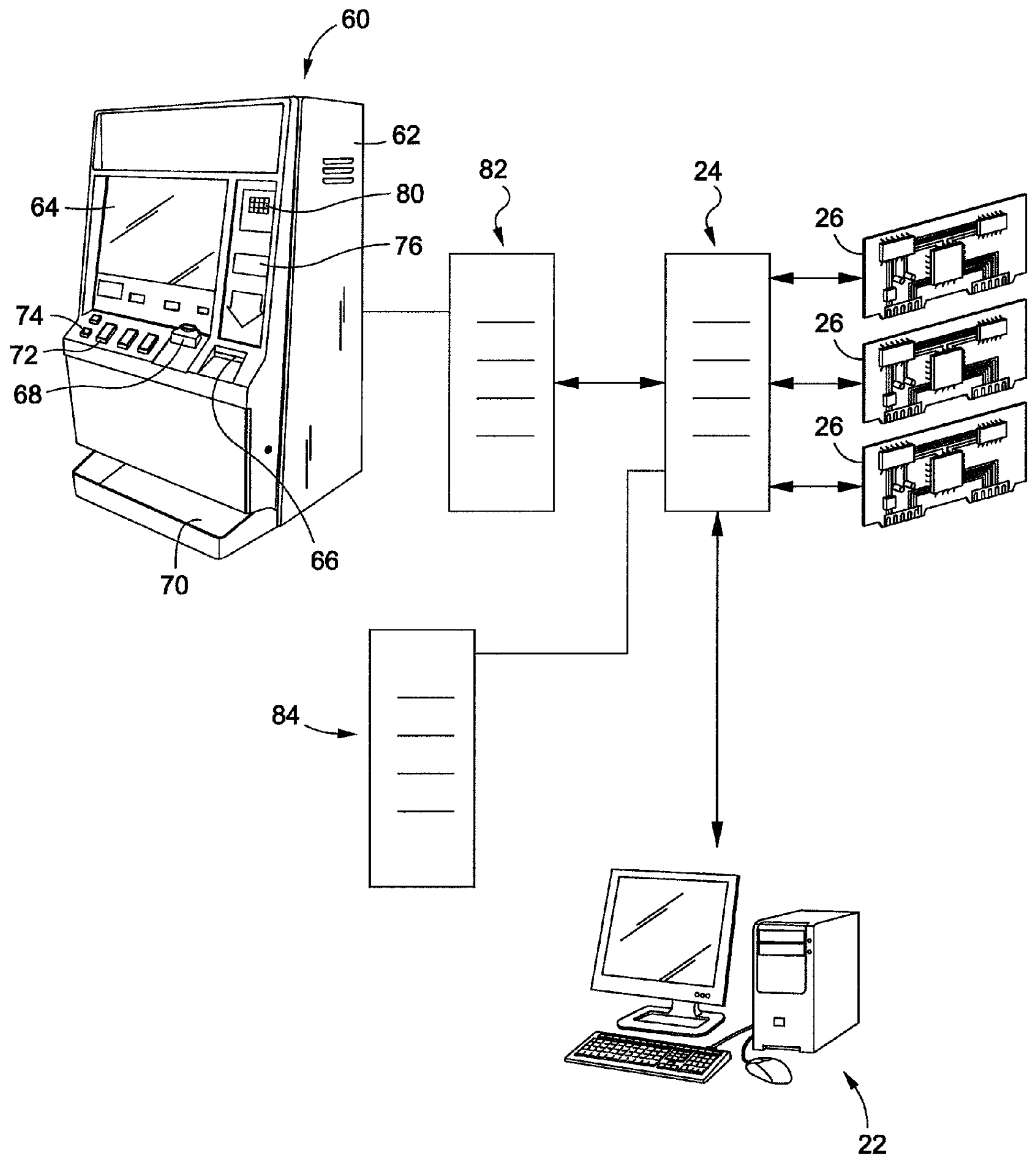
FIG. 5 illustrates the linking of a system of the invention with other components such as existing gaming machines and casino systems.

As illustrated in FIG. 5, a gaming system 20 of the invention may include or link to other systems and components. For example, a casino or other game provider may have a plurality of traditional gaming machines 60 on a gaming floor. Such traditional gaming machines 60 may have a plurality of features. For example, such a traditional gaming machine 60 may include a housing or cabinet 62 for enclosing/supporting various components of the gaming machine. The housing 62 may have a variety of configurations. In one embodiment, as illustrated, the housing 62 is configured so that the machine has an "upright" configuration. The traditional gaming machine 60 might also be configured as a "slant"-type, "bar-top" or have other forms.

In one embodiment, the traditional gaming machine 60 may be configured as a "video" type gaming machine, the machine including at least one display 64 for displaying game information to a player. The traditional gaming machine 60 may include other means for providing information to a player. For example, speakers (not shown) or other devices may be provided for generating sound associated with the game. The traditional gaming machine 60 may also include lights, printed instructions and other displays/display devices.

The games presented by the gaming machine(s) may be wagering type games wherein a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the traditional gaming machine 60 thus includes a bill validator/acceptor 66 for accepting paper currency and a coin acceptor 68 for accepting coins. Other means of payment, such as a credit card reader, may be provided. An award of winnings in the form of coins may be paid to the player via a coin tray 70.

Preferably, the traditional gaming machine 60 includes means for a player to provide input. In one embodiment, this means comprises one or more buttons. For example, a "spin" button 72 may be provided for permitting a player to start a game. One or more wager buttons 74 may be provided for a player to select the amount to bet on a particular game. Other means of input may be provided, such as a touch-screen display and other devices now known or later developed.

A game controller (not shown) is provided for controlling the various devices of the gaming machine and for generating game information. For example, the game controller may be arranged to generate video and audio data for presentation by the display and speakers of the traditional gaming machine 60. The game controller may be arranged to detect a signal from the coin acceptor indicating the receipt of coins or from the bill validator regarding accepted bills and for registering credits corresponding to those inputs, for subtracting credits for wagers placed by a player, and for causing a coin delivery mechanism to deliver coins from a coin hopper to the coin tray 70 for payment of winnings and/or return to a player of unwagered credits. Preferably, the one or more player input devices provide an output to the gaming controller for use in play of the game. For example, in response to a "bet one" input by a player, the gaming controller is preferably transmitted a signal which causes the gaming controller to initiate presentation of the game.

The gaming machine may include one or more random number generators for generating random game events and results. As indicated above, such a random number generator might be utilized to generate the game symbols for the positions of a matrix, be utilized to generate the base symbols, and be utilized to select award values for each symbol position, among other things.

As indicated, in one embodiment, game information is displayed by a video display 64 to a player. That display may be of a variety of types, including CRT, LCD, plasma and others. The gaming machine 60 may also include more than one video display.

In another embodiment, the traditional gaming machine 60 may include one or more physical reels capable of displaying symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference. For example, the base symbols might be associated with spinning reels. Sets of base symbols might be generated by spinning those reels.

Such traditional gaming machines 60 may have other configurations, including other features. For example, the traditional gaming machine 60 may include a player tracking device, such as a card reader 78 and associated keypad 80. Such player tracking devices are well known and may permit the game operator to track play of players of the gaming machine. The tracked play may be utilized to offer player bonuses or awards.

In one embodiment, the traditional gaming machine 60 may be configured to dispense media, such as printed paper tickets, which have associated value. For example, winnings or unused credits may be returned to the player via a printed ticket having value or associated value. In one embodiment, the gaming machine 60 might also be configured to accept such media for providing credit for game play. Such systems are well known and thus not described in detail herein.

A casino may have numerous such gaming machines 60, such as located on a casino floor or in other locations. Of course, such gaming machines 60 might be used in other environments, such as an airport, a bar or tavern or other locations.

As indicated, the one or more traditional gaming machines 60 may be linked to other devices, such as one or more servers 82 or other systems of a casino or game provider. Such one or more servers 82 might comprise an accounting server/system, a ticketing server/system, and/or a player tracking server/system or the like. For example, the one or more servers 82 might be used to generate ticket information to permit a traditional gaming device 60 to dispense a value cash-out ticket, or to verify such a ticket which is presented at one of the traditional gaming devices 60.

As another example, the one or more servers 82 might track player play. For example, a casino or other game provider may have a player loyalty club. Each player may be uniquely identified and information regarding the player, including their game play, may be stored in one or more data files. Based upon a player's play, such as amounts wagered, lost, won, time of play or various other criteria, a casino may award a player bonus or free play, free or reduced cost goods or services (such as a casino jacket, a dinner at a casino restaurant, etc.).

As illustrated in FIG. 5, the gaming machines 60 and gaming devices 26 may be in communication with one or more game servers 84 at one or more times. As described below, the game server 84 may be configured to generate game information for presenting one or more games. The games may comprise, for example, on-line multi-player poker games such as Texas Hold 'em.

The game server 84 may have various configurations. In one embodiment, the game server 84 is configured as a computing device. The game server 84 may be configured to execute machine-readable code for presenting a particular game, such as a poker game as detailed below. In this regard, the game server 84 may include or be linked to one or more random number generators (RNGs) for generating random game data or results.

In one embodiment, the gaming devices 26 or the one or more gateways 24, may be in communication with such secondary or other servers 82, including the game server(s) 84. For example, as detailed below, a player may be a member of a casino's loyalty club. When the player plays traditional gaming machines 60 offered by the casino, the player's play of games at those traditional gaming machines may be tracked. In addition, when the same player accesses and plays games via their assigned gaming device 26, that play may also be tracked (either separately or aggregated with the play of the one or more traditional gaming devices).

Of course, the gaming devices 26 and/or one or more gateways 24 may be in communication with or otherwise link to other devices and systems.

Various aspects of the invention comprise methods of presenting and playing wagering games. Aspects of such methods will now be described with additional reference to FIGS. 6A and 6B. In one or more embodiments, such methods may be implemented by the devices and/or systems as described above and illustrated in FIGS. 1-5, though the methods might be implemented in other environments and/or via other devices or systems.

As one aspect of the invention, a gaming device is assigned or registered to a particular player or entity, whereby that player or entity is the only player or entity which can access that gaming device and play games presented by that device. As illustrated in FIG. 6A, in one method, in a step S1, a player or other entity is registered. This may comprise obtaining information which identifies the player, such as their name, address, social security number, telephone number, email address or the like. Such a registration may be the same as the registration process for joining the casino's existing loyalty club. As such, in some embodiments, the first step S1 may be accomplished as part of a player's earlier or existing registration with such a club.

In one embodiment, one or more data files may be generated and data may be stored with those files. For example, a data file may be generated relative to the player and the player identification information may be stored in the file.

In a step S2, a gaming device 26 is assigned to the player. As indicated above, such a gaming device 26 might be identified by its port or serial number. Preferably, each gaming device 26 is assigned to only one player. Thus, as part of this step, the method may include determining which gaming devices 26 are unassigned and available for assignment.

In one embodiment, information regarding the gaming device 26 is associated with the player. For example, the serial number of the assigned gaming device 26 may be linked to the player's information.

In a step S3, a login or other access information may be provided to or associated with the player 26. For example, a player may be assigned a User ID and/or an access password, or the player might be permitted to select such (of course, criteria for the User ID and password, such as the format thereof, such be selected by the game operator and the User ID and password may be subject to clearance, such as to ensure that different players do not select the same information). As indicated below, such information may be used by a player to identify themselves and access their assigned gaming device 26.

As indicated above, such information may be stored in one or more data files, tables or the like. FIG. 6C illustrates one exemplary data table. Such a table might be stored, for example, at the one or more gateways 24, one or more data storage devices associated with the one or more gateways, or other devices, such as a player tracking server 82 (see FIG. 5).

In the example illustrated, the data table includes fields which identify the player's name, their assigned or selected User ID, their assigned or selected password, and the serial number for the gaming device which is assigned to them. Of course, the data table might include other or additional information. Further, other or additional information might be stored other files or tables, including linked to the illustrated table. For example, another data table or file may store the player's identifying information, such as the physical address, telephone number, email address, etc. for the player whose name is listed in the illustrated table.

It will be appreciated that the above-referenced method may be implemented in various manners. For example, a player could fill out a physical registration form (such as using a pencil/pen) and submit the form to a game provider, such as at a player loyalty club desk. The operator might then key, scan or otherwise input required or important data into the system. In another embodiment, the registration process might be accomplished through a kiosk or access terminal at a casino or similar location, which kiosk or access terminal is linked to the gaming system. In yet another embodiment, the registration process might be accomplished by a player's presentation device 24. For example, a player might utilize a desktop computer to access a website of the casino on the Internet. The casino's website might have a registration utility which causes a graphical user interface or the like to be displayed upon the player's computer and via which the registration process may be completed.

The player identity information may also comprise other than a User ID and password. For example, a player might uniquely identify themselves via an encryption key, a fingerprint, retina scan or other types of information.

As one aspect of the invention, a player may access a unique gaming device 26 which has been assigned to them and, via that gaming device 26, play one or more wagering games. In a preferred embodiment, the method permits a player to access their gaming device 26 via a presentation device 24, and have one or more games presented by the gaming device 26 at their presentation device.

In accordance with one embodiment of a method, referred to FIG. 6B, a player provides access or login information. Preferably, such comprises the player providing information which identifies the player, as in a step S4. In one embodiment, this may comprise the player's User ID and password.

This step may be accomplished in various ways. For example, a casino may provide a website on the Internet. The player may access that website via their presentation device 24. The website may include a link, such as "Game Play Login" link. Upon clicking that link, a page or interface may be displayed to the player which requests their login information (such as providing a box or field for the player to input their User ID and another box or field into which the player may insert their password).

In a step S5, the player's identification or login information is verified. This may comprise, for example, comparing the user's User ID and password to those stored in the one or more data files. If no match is found, the player may be notified of such and the login process may either be terminated or the player may be requested to re-input their information again for verification, as in step S6.

In a step S7, if the player's identification is verified, the player is linked to their assigned gaming device 26. For example, if the player "Rocco Tarantino" has correctly identified himself with the appropriate User ID and password shown in the table in FIG. 6C, then he may be linked to his gaming device 26 which is identified with the serial number 2XF7114GK21. In one embodiment, referring to FIG. 1, this linking comprises placing the player's presentation device 22 in communication with their assigned gaming device 26 via the one or more gateways 24.

Once the player is linked to their unique assigned gaming device 26, the gaming device may present, and the player may play, one or more games as in step S8. As indicated herein, this may comprise the gaming device generating game information, including data representing video images. This data is transmitted from the gaming device 26 to the player's presentation device 22, such as through the gateway 24.

Of course, various games may be presented to the player. In one embodiment, when a player is linked to their gaming device 26, the gaming device may cause a graphical user interface to be displayed by the player's presentation device 22. That interface may permit the player to select different games for play, change play options or engage in other activities. For example, the player might be permitted to pick from a suite of different video slot games and/or video poker, keno, bingo or other games now known or later developed.

A player may provide input, such as via a touch screen of their presentation device 22, of a particular game to be played. This input is transmitted through the gateway 24 to the gaming device 26. At that time, the gaming device 26 begins the game, including by transmitting game information back through the gateway 24 to the player's presentation device 22. Such game information may comprise, for example, a video game display which illustrates images of slot reels and other information, cards or the like (depending on the game being presented).

Depending on the game being presented, the player may be required to provide various inputs and various information may be displayed to the player. For example, in a game of video poker, the player may be shown a set of dealt cards and then select one or more or all of the cards to be held and/or discarded.

As indicated herein, one or more of the games which are presented to the player are preferably wagering games in which a player places a wager and has the chance to win winnings. In one embodiment, the player provides value which is represented by one or more credits and has the opportunity to win credits or monetary wins represented by credits.

In one embodiment, the player may be required to deposit monies with the game provider, such as into an account which is associated with the player. For example, the player might deposit cash or provide a credit or debit card which is used to transfer an amount of funds, such as $500.00, to the player's account. Those funds may be represented by credits, such as 2000 credits where each credit has a value of $0.25, or 500 credits each having a value of $1.00.

In other embodiments, the player might provide value when the game is to be played. For example, the gaming device 26 might prompt the player to provide value account information, such as information regarding a credit or debit card. The player might provide such information via their presentation device 22. The gateway 22 might transfer such information to one or more external servers 82, such as an accounting server. The accounting server may communicate with a banking system or the like to affect a transfer of funds from the player's bank or credit account to an account belonging to the game provider.

In an embodiment where the player has an established account, the player may provide casino account information. In other embodiments, the player might store debit or credit card or bank account information in association with their player profile and such information may be automatically used to fund wagers.

In one embodiment, a player may then make a selection of the amount to wager as part of the play of a game. In one embodiment, a player may even be permitted to select the wager denomination for the game. For example, a game may require that the player place a minimum wager of 1 credit up to a maximum wager of 5 credits. However, the player may be permitted to select the denomination of each credit, such as $0.01, $0.05, $0.10, $0.25, $1.00 or other values.

Once the player made their wager selection, the wagered value may be deducted from their casino account, bank account or the like or may be charged to their credit card. In one embodiment, once the wager has been verified (such as by a signal from the accounting server to the gateway and on to the gaming device), the gaming device may present the game.

As indicated, one or more (but preferably not all) of the possible outcomes of the game may be designated as winning outcomes. One or more of the winning outcomes may have an associated award, such as an award of one or more credits. The number of credits for particular winning outcomes may vary, such as defined by a pay table for the game.

If a player receives a winning outcome having an associated award, the player is preferably credited with such an award, such as the number of credits. The credits may be credited to the player's casino account, for example. In other embodiments, the credits may be aggregated during game play and at one or more times the player may elect to "cash out" by having the monetary value represented by those credits be transferred to the player's bank account.

One embodiment of the invention is a method of presenting and/or playing an on-line wagering game. As detailed below, in one embodiment, such a game may comprise a game of poker, and most preferably a multi-player poker game such as Texas Hold 'em. In a preferred embodiment, such a game is presented via the system 20 described above. It will be appreciated, however, that the methods of the invention might be implemented by other systems and that the various features of the invention may be applicable to other games. For example, the method of the invention may apply to the presentation of other types of games and the features of the methods described herein may apply to games presented in other manners.

In one embodiment of the invention, a player is permitted to play or participate in an online wagering game via a presentation device (see FIG. 5). The method will be described with reference to a Texas Hold 'em multi-player game, though the method is applicable to other games.

Figure 7:
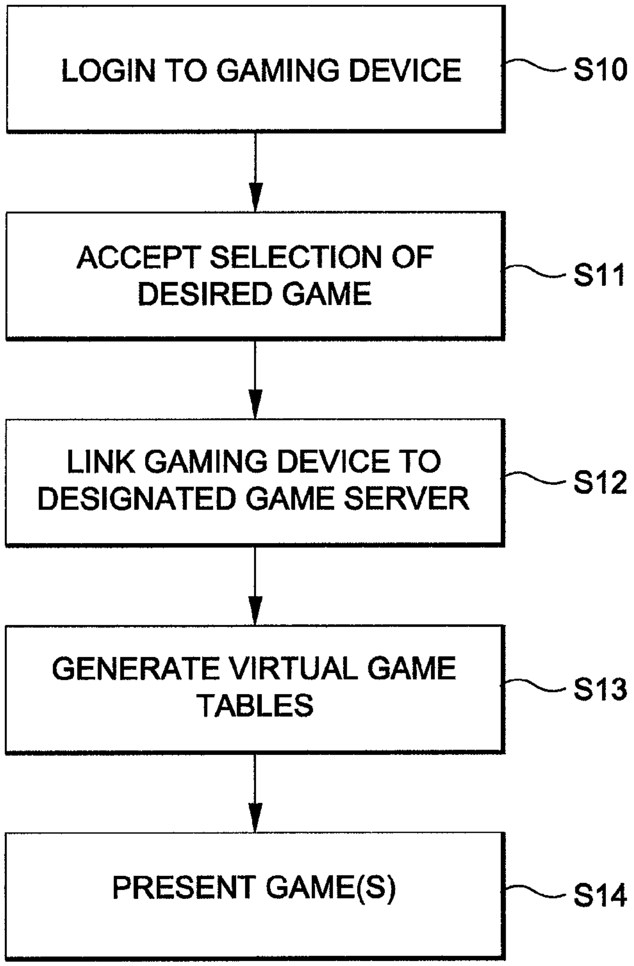
FIG. 7 is a flow diagram illustrating a method of implementing an on-line wagering game in accordance with an embodiment of the invention.

Referring to FIG. 7, in one embodiment a player logs into their personal gaming device 26 in a step S10, such as in the manner described above. As indicated above, the player may be then presented with a menu of options. One option might be to play one of various online games, including a multi-player on-line poker game such as Texas Hold 'em. The system 20 preferably receives the player's selection, as in step S11.

In a step S12, the player's gaming device 26 is linked to a designated game server 84 (see FIG. 5) which is capable of presenting the selected game. In one embodiment, each player which selects a particular game is placed into a game queue. The game queue may be generated at the game server 84. For example, each player who elects to play the game of Texas Hold 'em is placed in a Texas Hold 'em game queue. Of course, different game queues may be created for different games. Different queues may be created for variations of the same game, such as one queue for players who wish to play $2/$4 limit Texas Hold 'em and another queue for players who wish to play $10/$20 Texas Hold 'em.

It is possible for a single game server 84 to implement various games and thus generate associated queues for each game. In other embodiments, the system may include multiple game servers 84 wherein different servers implement different games and thus the different queues associated therewith.

In a step S13, the game serer 84 preferably assigns players to game instances. For example, the game server may create or generate one or more virtual game tables from the players which are in the associated queue. Each game table may have varying numbers of players, such as 8-12 players (or more than 12 or less than 8 players). The players for each virtual game table or "game instance" are preferably selected randomly from the associated queue. In the event a table requires a certain minimum number of players and the queue does not have the required minimum number of players, the game server 84 may wait to form another virtual game table and begin game play until the required number of players exists in the queue. For example, if the queue has 43 players and each game table is set to have 10 players, the game server 84 may form 4 tables of 10 players each and then hold the remaining 3 players in the queue until another 7 players join the queue.

In a step S14, once a game table is formed, the game server 84 preferably initiates presentation of one or more games to the players assigned to that table or game instance. In one embodiment, the method of game play may vary depending upon the particular game. In a preferred embodiment, the game server 84 generates game information which is transmitted to each player and the game server 84 receives input from each player.

In the case of the system 20 such as that described above, the game server 84 preferably generates game information and routes it, as appropriate, to each player via their personal gaming device 26 (and thereon to the player's presentation device 22, such as through a gateway 24, over one or more communication links). Likewise, each player preferably provides input to the game server 84 through their personal gaming device 26.

For example, the game server 84 may generate and transmit information to each player which causes a graphical user interface to be displayed to the player. The graphical user interface may include, for example, an image of a gaming table and associated game information. The game information may include, as detailed below, information regarding participating players, wagers, cards, game outcomes and the like.

For example, relative to a game of Texas Hold 'em, the cards which are dealt to each individual player may be shown to each player that the cards are dealt to and then all community cards may be displayed to all of the players. In general, game information may be generated and displayed in electronic form in similar manner to the manner by which a standard table game of Texas Hold 'em is presented, including in accordance with the particular rules which are being applied to the game.

Figure 8A:
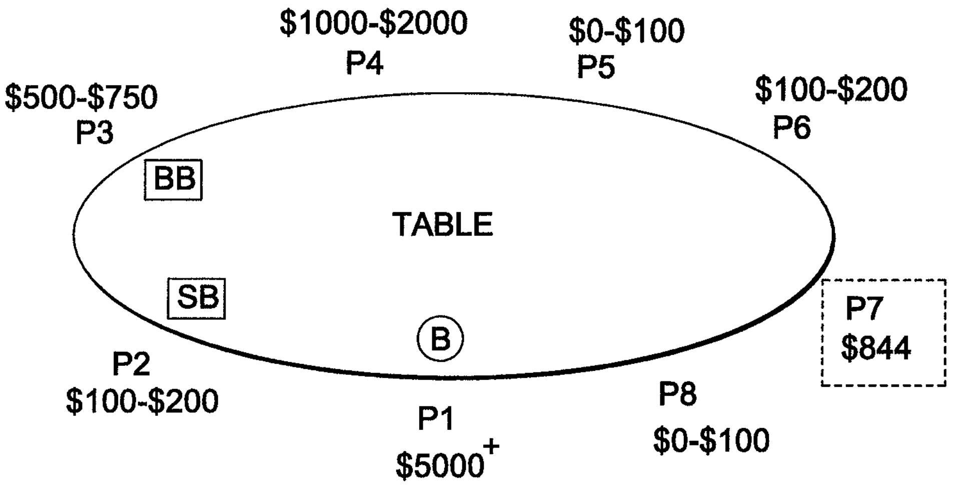
FIGS. 8A and 8B illustrate graphical displays of virtual gaming tables in an on-line wagering environment.

Preferably, information is provided to the players in a manner which reduces the probability of player collusion. First, player information is provided in a manner by which player identities remain anonymous. For example, players may be identified by randomly assigned names, numbers or other designators. For example, in a game of 8 players, the players might be identified by letters A-H, the letter/number combinations P1-P8 as illustrated in FIG. 8A, or other designators which are not selected by the players.

In one embodiment, each player is assigned or associated with a table position. The players' table positions may be illustrated relative to a visual representation of a table. The player positions may, such as in the case of Texas Hold 'em, determine the order of play or actions in the game. As illustrated in FIG. 8A, a graphical image of a virtual poker table may be displayed to each player, which image also displays player positions. In a preferred embodiment, the player's assignment to a particular position may be highlighted or the like (relative to the other player positions) so that the player recognizes their assigned position. For example, in FIG. 8A, the particular player who is viewing the image of the virtual poker table has been assigned position P7.

Figure 8B:
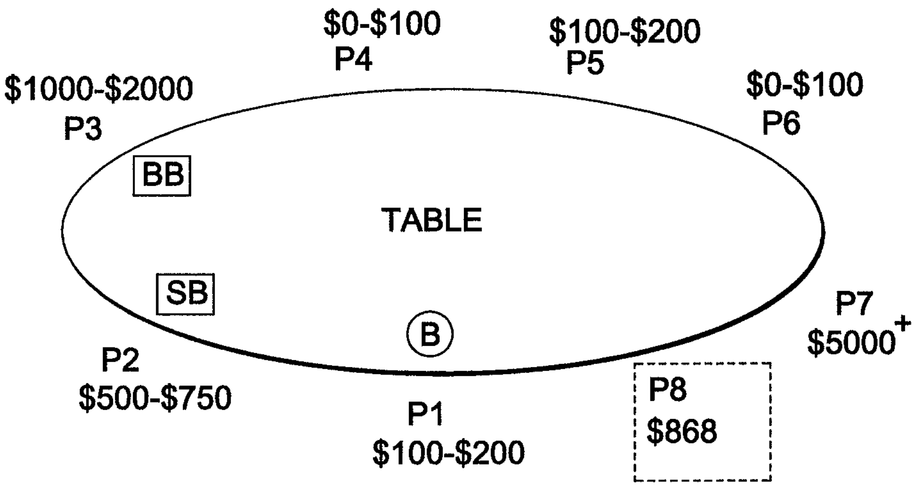

In one embodiment of the invention, the positions of one or more players who are assigned to a virtual gaming table may be altered from time to time. In one preferred embodiment, the positions of the players are randomly re-assigned or changed after each game or each round of play. For example, as illustrated in FIGS. 8A and 8B, after a game or round of play in which the viewing player was assigned to position P7, the player has been re-assigned to position P8.

In some games, the position of each player at the table has an impact upon game play. For example, in the game of Texas Hold 'em one player is assigned a "button" and becomes the dealer. The first two players to the left of the button are assigned the small blind and big blind positions, as such as known in that game. After each game, the button generally moves clockwise around the table.

In one embodiment of the game, the positions of players are re-assigned in a manner which causes the positions of players to be changed from game to game, but maintains movement of players to key positions. For example, after the game illustrated in FIG. 8A, the button would move to player P2 and players P3 and P4 would become the small and big blinds. In this arrangement, the players who were originally assigned positions P1, P5, P6, P7 and P8 can all be randomly assigned.

As one example, referring to FIGS. 8A and 8B, the players were re-assigned positions as follows:

| Player | Game 1 Position (FIG. 8A) | Game 2 Position (FIG. 8B) |
|---|---|---|
| Bob | P1 | P7 |
| Sue | P2 | P1 |
| Jim | P3 | P2 |
| John | P4 | P3 |
| Al | P5 | P4 |
| Mary | P6 | P5 |
| Bill | P7 | P8 |
| Ann | P8 | P6 |

After the game illustrated in FIG. 8B, player positions would again change, but preferably in a manner that causes Jim to become the button/dealer (position P1), John to move to the small blind (position P2) and Al to become the big blind (position P3—because Al was originally in the fifth position in Game 1, Al should be in the big blind position by Game 3). The positions of the remaining players may be randomly re-assigned.

Because the player's identities are not disclosed, players can not readily identify one another. In addition, manner, movement of the players to various positions makes it very difficult for each player to attempt to determine the identity of another player by monitoring the actions of players over time (because player positions vary from game to game it is difficult for a player to track other players' play in a manner which would yield identity clues). For example, two players might log in to play Texas Hold 'em at the same time and talk to one another on the phone. First, the players may not even get assigned to the same game table. Second, as the players share information regarding the games they are playing, they might determine that they are at the same game table. However, at the end of a particular game, movement of the players to new positions would cause the players to have to work to determine their new positions again. By that time, the player's positions would change again, etc. In this manner, the probability that players can work together is reduced.

One aspect of a poker game is a player's assessment of other player's chip counts in developing a game play strategy. It will be appreciated that if exact player chip totals are displayed to all players, then the identity or positions of players may be tracked even as they are re-assigned because a player's chip totals move with the player's reassignment. Thus, as one aspect of the invention, player chip totals may be displayed in one or more ranges. The displayed ranges permit players to make game decisions but at the same time do not readily permit players to identify one another by their chip count.

For example, FIGS. 8A and B illustrate an embodiment where player chip ranges of $0-100, $100-200, $200-500, $500-750, $750-1000, $1000-2000, $2000-5000 and $5000 and above are utilized. It will be appreciated that more than one player may have a chip count which falls into a designated range and/or no players may have chip counts which fall within a designated range. In one embodiment, each individual player is preferably shown their own exact chip total. Of course, it is preferred that the chip ranges cause multiple players to fall into the same range, thus making it difficult for players to identify one another. Thus, various ranges may be used, such as based upon the table limits and the like. In one embodiment, ranges might be chosen or changed based upon the actual distribution of chips. For example, at a $2/$4 table, no player may have a chip total of more than $500. In such a configuration, ranges of $0-100, $100-250 and $250-500 may be utilized, so as to group as many players as possible into common ranges. Of course, as illustrated in FIGS. 8A and 8B, each individual player's chip total may be displayed to each player.

In one embodiment, virtual game tables may open and close. A table may close when one or more players elect to stop play. For example, a virtual Texas Hold 'em table might close when a single player elects to stop play or it might be closed when the number of remaining players drops below a predetermined minimum number. Preferably, if a table closes, active players are assigned back to the table queue and those players are randomly re-assigned to one or more newly formed tables.

The game server 84 may accept wagers and settle winnings via each player's gaming device 26. For example, as indicated above, a player may have a monetary account wherein the balance is tracked by the gaming device. When a player places a wager or bet in an on-line game presented by a server 84, that player's bet is facilitated by the player's gaming device 26, wherein the wagering device checks the player's balance and deducts the wager or bet. Likewise, the server 84 can indicate winnings and cause monetary amounts to be credit to the player's account.

In one embodiment, a player may be required to select a stake and must leave a game table when the stake is exhausted. For example, a player may have $500 on account with a casino. The player may select a stake of $250. The player's gaming device 26 may transfer $250 to the game server 84. If the player's balance reaches zero, the player may be forced to leave the table and, if the player wishes to continue to play, be assigned to a new table. This prevents a player from simply continuing to add new funds into an existing game. One benefit to this arrangement is that it again further reduces collusion.

As one aspect of the invention, various bonuses, jackpots or the like may be maintained or implemented in association with an on-line game. For example, a progressive jackpot might be generated and awarded when an player receives a particular poker hand while playing Texas Hold 'em. The jackpot might be awarded to the player who receives the designated hand when that player's two cards in combination with the community cards form the designated hand, while the jackpot might be split among all players when the designated hand is formed solely from the community cards. Of course, bonuses or jackpots might be awarded in various circumstances and be split in various manners.

In one embodiment, the one or more jackpots might be funded from an entry fee or from a portion of wagers which are collected by the game operator as a vig. In one embodiment, a player might pay a lease fee for their personal gaming device. In that arrangement, a portion of the lease fee might fund one or more jackpots.

Of course, various of the above-described features may be applied to other types of games, such as poker games other than Texas Hold 'em and games other than poker. Also, various of the features might be implemented by other systems. For example, the anti-collusion features might be implemented in a standard server-based on-line gaming environment.

Various additional aspects of the invention will now be described, including advantages thereof. In accordance with one embodiment of the invention, specific gaming devices are associated or assigned to specific players. In this manner, only a single player can play a gaming device. This arrangement has a number of advantages.

First, as indicated above, many players do not like other players to play the gaming machine they wish to play. In accordance with the invention, the gaming device can only be played by the assigned player. This is true even during the times the player is not playing the gaming device.

Of course, in traditional game play while a player is playing a traditional gaming machine that player is the only one that can play the machine. However, once the player is done playing (such as when the leave the gaming machine), another player may then begin play of that same gaming machine. In accordance with the invention, this is not possible. In particular, only the assigned player can ever link to their assigned gaming device. For example, if a first player ceases game play of their assigned gaming device, another player cannot play the first player's assigned gaming device because no other player can access or log into that gaming device (other players are only able to log into their own uniquely assigned gaming devices).

The configuration of the invention also has advantages over solely server based games. In particular, as indicated above, each gaming device 26 is configured to independently generate its own games/outcomes. Thus, each player's play of their own gaming device is not affected by any other player's play of their assigned gaming device. This is unlike server based gaming in which a server having a random number generator may generate multiple game outcomes for a plurality of players. Many players do not like server based gaming for the same reason as traditional gaming machines: the involvement of other players and outcomes which are perceived to change their odds of receiving a winning outcome. Again, in accordance with the present invention, each assigned gaming device generates its own outcomes only for its assigned players. In this manner, no outcomes are generated or received by any other players relative to a single one of the gaming devices.

This feature of the invention also has a number of other advantages. For example, the status or game state of play relative to a player's gaming device is always maintained by the gaming device. As indicated in the Background herein, a player of a traditional gaming device might play a number of games and increase a progressive jackpot to a large value. However, once the player stops playing, another player might play the same gaming machine and after one or two games trigger the jackpot and win the winnings that were substantially grown by the previous player's play.

In accordance with the invention, no player(s) other than the assigned player can play their gaming device. Thus, only the player can reap the rewards of playing that device. This further means that different game states do not need to be maintained for different players or the like. For example, a certain game may allow a player to collect bonus symbols. A player may have collected 22 or the required 25 symbols needed to win a bonus. In accordance with the invention, that information is stored at or in conjunction with the player's assigned gaming device. Thus, the player may cease play at any time and then later resume play at the exact same point (and because no other intervening players may play that gaming device, no other game state information or the like needs to be saved nor can another player's play interfere with or take advantage of the assigned player's level or state of play).

In one embodiment of the invention it is contemplated that the gaming devices 26 may comprise relatively low cost computer boards. In this manner, a gaming device 26 may be manufactured and before ever being used, be assigned to a player. Preferably, once assigned to a player, the gaming device is never assigned to another player. For example, if a player wishes to permanently cease game play of their assigned gaming device, the casino or operator may destroy the gaming device 26 and replace it with a new one (which may be assigned to the same player or a different player).

In one embodiment, a player may be required to meet certain criteria in order to be entitled to be assigned a gaming device. For example, a player might be required to pay a fee, such as a "game purchase" or reservation fee. In other embodiments, a casino might offer such a feature to players who meet certain thresholds of game play of traditional gaming machines at the casino, as a promotion or the like.

Another particular advantage of the invention is that the system and method permit a player to play wagering games remotely, such as from a remote home or office computer or other device such as a portable PDA. This also has the advantage that a casino can offer game play to remote players without tying up traditional gaming machines on the floor of the casino. Thus, a casino may have 500 traditional gaming machines on their casino floor and thus serve up to 500 players via those machines. In addition, the casino might have 1000 gaming devices of the present invention, thus permitting up to an addition 1000 assigned players to play those devices at the same time as the 500 players of the traditional gaming machines.

Another aspect of the invention is that a player at a casino might play either traditional gaming machines, their assigned gaming device or one or more other on-line games. For example, a player might travel to a casino and play one or more traditional gaming devices. If the player wishes to stop play of such gaming machines to, for example, eat dinner, the player might access their gaming device via their PDA and play one or more wagering games while they eat dinner.

As indicated above, a player's play of their gaming device 26 may also be tracked, either separately from or in aggregated fashion with their play of traditional gaming machines. In this manner, a player's play of their gaming device 26 may be tracked so as to yield player loyalty rewards or the like. For example, a player who achieves certain criteria of play (such as amounts wagered, number of games played, number of losing outcomes, etc.) might be awarded free game play or free or reduced cost goods or services. As indicated above, such functions might be implemented by a player tracking server 82 which is provided game play information via the gateway 24.

In one embodiment, other features may be implemented relative to the gaming devices 26. For example, though each gaming device 26 is entirely independent, the gateway 24 or a bonus server 82 or the like might implement a system-wide progressive jackpot. For example, a bonus server 82 may be linked to the gaming devices 26 via the one or more gateways 24. If any player of their assigned gaming device 26 achieves a particular outcome, the bonus server 82 might cause that player to be awarded a bonus or progressive jackpot.

In one embodiment, the method and system may include means for verifying the eligibility of a player for play of their gaming device 26. Currently, many jurisdictions (such as states) do not allow wager-based gaming. Thus, if a player is located in such a jurisdiction, the player may not be permitted to play a gaming device, even if the gaming device is itself located in a jurisdiction in which gaming is legal.

In one embodiment, location information may be transmitted from the player's presentation device 22 to the gateway 24 for verification by the gateway or an associated device/system. For example, when a player is utilizing a computing device to access the gateway 24 via the Internet, the player's location might be determined from the IP address of the user's presentation device 22. If the player accesses the gateway via a PDA or cell phone, the player's location may be determined by the location of the device as determined by the cellular phone network.

In one embodiment, a player may be assigned a cellular network card for their computing device. That card may interface with the cellular network to obtain location information. That location information may be transmitted via the player's computer over a computer network, such as the Internet.

In other embodiment, GPS devices may be utilized to determine the player's location. The GPS location information may be transmitted to the gateway 24.

As indicated, players may utilize their assigned gaming device 26 to play or participate in games which are presented by a game server 84, such as a multi-player poker game. In particular the system 20 is particularly adapted to presentation of multi-player on-line games by linking the players through their personal gaming devices (such linked through one or more game servers).

One advantage to the arrangement of the system of the invention over conventional server based gaming systems is the segregation of player information based upon the player's assignment to a particular gaming device 26. As indicated above, a player's placing of wagers, assignment of winnings and other game activity all occurs via their gaming device 26. In this manner, the player's net loss or winnings during various periods of time may easily be tracked and reported (such as for taxation purposes, including reporting to state or federal taxing authorities). For example, a casino may track the direct game play and on-line multi-player game play of each particular player through their assigned gaming device 26. Thus, at the end of the year or the like, the casino can easily generate a report for each player which shows that player's net win or loss for all types of game play. That single report can be provided to the player or appropriate taxing entities.

Relative to the method of online game play, one advantage is a game which reduces the probability of player collusion. In this regard, an advantage to the invention is a method and system for preventing collusion in the first instance, rather than attempting to detect when collusion is occurring.

As one aspect of the invention, player identities are anonymous. In some systems, a player logs in or enters a game using a selected user name, thus allowing players to identify each other. In accordance with the invention, each player is randomly identified.

In addition, in accordance with the invention player positions and associated identities at a game table are changed from time to time. Again, this reduces the probability that players can identify one another reliably and thus collude with one another.

The particular manner of changing player positions is advantageous. For example, it might be possible to move players to different virtual tables after each game or round of games. However, this may interrupt the natural progression of players to the button, small blind and big blind positions in games such as Texas Hold 'em. In addition, players often like to play against the same players for a period of time as they attempt to learn the other players' strategies and change their relative position based upon chip count. If players are moved from table to table, these important aspects of the game may entirely be disrupted.

As indicated, as one aspect of the invention even related player information such as player chip count may be disguised. By only providing chip value ranges rather than specific chip totals, a player can not readily identify and track each particular player in the game in a manner which would permit two or more players to readily identify each other and collude with one another.

It will be appreciated that the systems and methods of the invention may be implemented in various environments. For example, the systems and methods may be implemented at a traditional casino, as described above. The systems and methods might also be implemented via a tavern or other game operators, including route operators (such as airports, convenience stores or the like), or even via operators not having a traditional physical casino.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of presenting a multi-player online game to at least two players comprising the steps of:

assigning a gaming device to each player;

storing player identification information in association with information which identifies said gaming device assigned to said player;

receiving player identification information from a presentation device of each player;

verifying said player identification information;

if said player identification information is verified, establishing a communication link between said player's presentation device and said gaming device assigned to said player;

linking said player's gaming device to a game server;

placing each linked player into a game queue;

randomly assigning each player in said game queue to an instance of an on-line game generated by said game server;

relative to each game instance, generating game information at said game server regarding a game; and transmitting said game information regarding said player's assigned game instance from said game server through each player's gaming device to said player's presentation device via said communication link.

2. The method in accordance with claim 1 wherein said gaming devices comprises electronic circuit boards.

3. The method in accordance with claim 1 wherein said gaming devices are not capable of directly displaying game information.

4. The method in accordance with claim 1 wherein said game comprises Texas Hold 'em.

5. The method in accordance with claim 4 wherein said game information comprises a graphical user interface including a representation of a poker table having multiple players.

6. The method in accordance with claim 1 further comprising the step of assigning at least two players to each game instance.

7. The method in accordance with claim 6 further comprising assigning different player designators to each of said at least two players of each game instance.

8. The method in accordance with claim 7 further comprising the step of presenting a sequence of games relative to the players assigned to each game instance.

9. The method in accordance with claim 8 further comprising randomly re-assigning said player designators to said at least two players after each game in said sequence of games.

10. The method in accordance with claim 1 wherein said game information comprises a chip value range for said players assigned to said game instance.

* * * * *